United States Patent [19]
Stratton

[11] 3,939,525
[45] Feb. 24, 1976

[54] LOCKING PLATE FOR ADJUSTABLE ARMS

[75] Inventor: Donald W. Stratton, St. John, Ind.

[73] Assignee: The Anderson Company, Gary, Ind.

[22] Filed: Jan. 6, 1975

[21] Appl. No.: 538,964

[52] U.S. Cl. .............................. 15/250.35; 403/374
[51] Int. Cl.² ......................................... B60S 1/32
[58] Field of Search ............... 15/250.31–250.42; 403/374, 377, 330, 409

[56] References Cited
UNITED STATES PATENTS

| | | | |
|---|---|---|---|
| 1,918,519 | 7/1933 | Clements | 403/374 X |
| 2,528,979 | 11/1950 | Smulski | 15/250.35 X |
| 2,691,790 | 10/1954 | O'Shei | 15/250.35 |
| 3,064,297 | 11/1962 | Krohm | 15/250.35 |
| 3,466,694 | 9/1969 | Feldstein | 15/250.35 |

*Primary Examiner*—Peter Feldman
*Attorney, Agent, or Firm*—Wegner, Stellman, McCord, Wiles & Wood

[57] ABSTRACT

A windshield wiper arm is provided with an adjustable extension which is positively locked in a preselected position by a non-metallic shim urged against a portion of said extension by an eccentric or cam-actuated lever.

3 Claims, 5 Drawing Figures

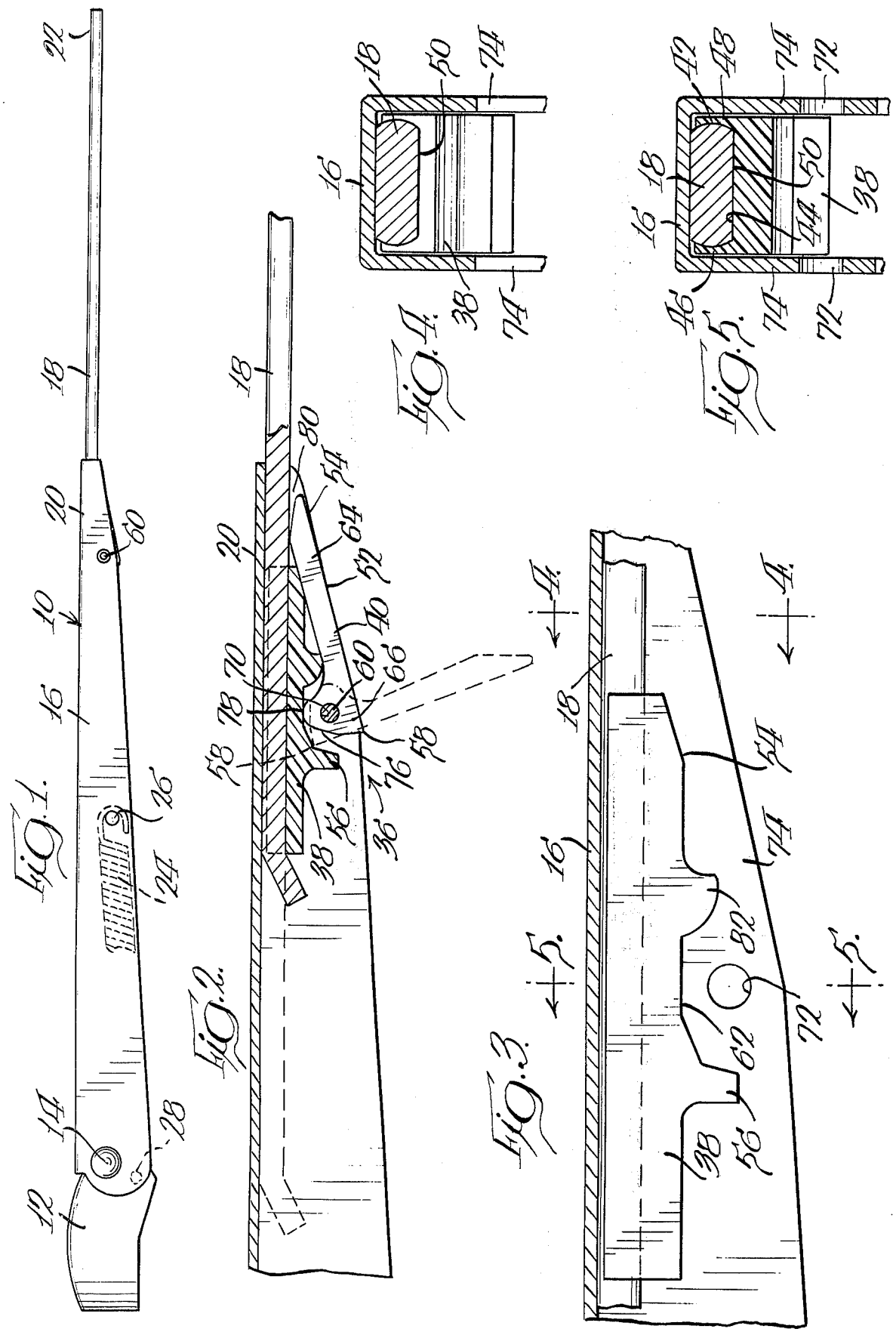

LOCKING PLATE FOR ADJUSTABLE ARMS

BACKGROUND OF THE INVENTION

1. FIELD OF THE INVENTION

This invention relates to a windshield wiper arm and, more particularly, to an adjustable length windshield wiper arm.

2. DESCRIPTION OF THE PRIOR ART

Each model car put out each year by each automobile manufacturer has a pair of windshield wiper arms which can be the same or can be different from the wiper arms either on previous model years or on cars of the same or of different automobile manufacturers. One particular difference between models is the requirement that the wiper arm be of different lengths. To meet the problem of filling the need for the large number of wiper arms of different lengths, several concepts were designed and patented for making the outer portion of the wiper arm adjustable with respect to the channel portion of the arm so that one arm could be used to fill the needs for a large number of arm length requirements. The elongation was generally accomplished by threading the arm extension inwardly or outwardly with respect to the channel portion of the arm until the desired length had been arrived at. At that point, various locking arrangements were provided for locking the arm extension relative to the arm channel. One such construction is shown by the F. A. Krohm U.S. Pat. No. 3,064,297 wherein an eccentric lever is used to urge a spring plate against a bronze liner bearing against the arm extension such that in the latched position of the eccentric, the arm extension is locked relative to the channel portion of the arm.

Other forms of locking arrangements have been provided which entail pivoted lever arrangements for applying pressure against a cover on the channel portion of the arm to urge the arm extension against the channel portion for locking the extension relative to the channel portion.

The prior art devices were relatively expensive to manufacture in large measure because of the number of parts required in the assembly. The additional parts created stocking problems, adding to the inventory and manufacturing expense.

SUMMARY OF THE INVENTION

In a windshield wiper arm having an extendable arm extension, a pivoted eccentric or cam lever is mounted between the side walls of the channel and bears against a non-metallic locking or braking part such that with the eccentric in the latched position, the non-metallic part is urged into positive locking association with respect to the arm extension. Since the number of parts involved in the locking arrangement is reduced, the manufacturing costs are lowered while still maintaining a highly efficient and effective latching arrangement.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a side elevational view of the windshield wiper arm embodying the invention;

FIG. 2 is an enlarged partial elevational view shown in section illustrating the operative parts of my improved latching arrangement;

FIG. 3 is a further enlarged, broken away cross-sectional view similar to FIG. 2 only with the latch and eccentric removed;

FIG. 4 is a cross-sectional view taken along the lines 4—4 of FIG. 3; and

FIG. 5 is a cross-sectional view taken along the lines 5—5 of FIG. 3.

DESCRIPTION OF THE PREFERRED EMBODIMENT

Referring to the drawings, the windshield wiper arm 10 includes a mounting head portion 12 which is adapted to be connected to a drive shaft (not shown). A pin 14 pivotally attaches the mounting head 12 to a U-shaped channel member 16. An arm extension bar 18 is carried by the outer end portion 20 of the channel member 16 and has an appropriate connector 22 at the remote end thereof. In the usual form of wiper blade, the channel member 16 will enclose therein a spring 24 which is connected between pivot 26 in the channel member and pivot 28 on the mounting head. The spring will urge the channel member 16 and the arm extension bar 18 toward the windshield to apply pressure to a wiper blade for wiping the windshield. Encased within the outer end portion of the channel 16 is the solid, elongate outer arm extension bar 18 having an inner end portion with a part bent at an angle to provide a retaining portion 32. The outer end portion of the arm extension bar 18 is shaped or configured to provide a connector 22 for connecting the arm to a wiper blade. Any one of the large selection of connectors available in the trade can be used on the outer end portion of the arm.

The channel-shaped portion 16 overlaps the inner end portion of the arm extension bar 18 and supports a latching arrangement 36 which serves to lock the arm extension bar 18 relative to the channel 16. The latching arrangement 36 is comprised of just two parts, a non-metallic locking shim 38 and an eccentrically mounted locking lever 40. The locking shim 38, in the illustrated form, is an elongate molded plastic part and has formed throughout the length thereof a shaped recess 42 into which recess 42 the arm extension bar is intended to nest. The recess 42 has a bottom wall 44 and upwardly extending, spaced apart side walls 46, 48. The bottom wall 44 engages the bottom face 50 of the arm extension bar and may have serrations or other friction inducing treatment thereon, such as embedded abrasive elements in said bottom wall 44 or the like. The locking shim is shaped on one end portion in a taper 52 toward the open end of the channel with the slope of the taper a little greater than the slope of the edges 54 of the angled sides of the wall 74 of the channel. The midportion of the locking shim 38 has a rib or crosslug 56 which is adapted to be engaged near the base of the rib 56 by the extreme corner 58 of the locking lever 40 in the event said locking shim 38 shifts relative to a pivot pin 60 for the lever 40. The rib or lug 56 also serves as a reinforcing rib to add rigidity to the locking shim 38. The locking shim 38 has a cutout portion 62 formed in the side opposite to said recess 42. The cutout portion 62 is bounded on one side by the rib 56.

The locking lever 40 has an actuating arm portion 64 and a body portion 66. The pivot pin 60 passes through an opening 70 in said body portion 66 and is secured in aligned openings 72 in the side walls 74 of the channel member 16. The body portion 66 of the lever 40 is eccentric in shape and has a flat, shallow land 76 which merges into a rounded cam or eccentric locking portion 78. The distance from the center of the pin 60 to the eccentric locking portion 78 of the body portion 66 is greater than the distance between the center of the pin 60 and the flat land 76 on said locking lever. The cutout portion 62 of the locking shim 38 is adapted to partially receive the body portion 66 of the locking lever 40 when the actuating arm 64 projects outward, away from the locking shim 38. Upon pivoting the locking lever 40 about the pin 60 toward the arm extension bar 18, the eccentric locking portion 78 will engage the cutout portion 62 and will urge the bottom wall 44 of the locking shim 38 against the bottom surface of the arm extension, thereby locking the arm extension relative to the channel member. The actuating arm 64 will nest between the overhanging side walls 74 of the channel so as to be shielded from accidental actuation. When it is desired to lengthen or shorten the arm, the end of a finger or a screwdriver is inserted in the opening 80 between the end of the actuating arm 64 and the bottom wall of the arm extension to pivot the locking lever about the pin 60 in a clockwise direction until the flat land 76 on the body portion of the lever 40 is juxtaposed with the base of the cut out 62. The arm extension bar 18 can now be moved out or in relative to the channel 16 for lengthening or shortening the arm.

It should be noted that the locking shim 38 is not staked or otherwise secured in the channel of the arm. The locking shim 38 is held in position by the rib 56 and the enlargement 82 on opposite sides of the cut out 62 in said locking shim 38 engaging with the body portion 66 of the locking lever 40 no matter whether the locking lever 40 is in the locked or unlocked position.

Since the locking arrangement is comprised of only two parts, one of which is the lever having the eccentric which is movable into engagement with the free floating non-metallic locking shim, the locking arrangement can be readily assembled substantially without error. Since the number of parts have been reduced to a minimum, the inventory of parts necessary to construct the prior locking arrangements have been obviated thereby reducing the manufacturing costs and reducing the ultimate price of the extendable windshield wiper arm.

I claim:

1. A windshield wiper arm comprising a channel-shaped section pivotally carried by an attaching section, an elongate arm extension member extending into the outer end of said channel-shaped member, a latching shim nested in said channel-shaped member in engagement with one end portion of the arm extension, said shim is elongate and has a channelled-out upper portion shaped to generally conform to the shape of the arm extension and wherein said arm extension nests in said channelled-out portion, lever means pivotally connected between the side walls of the channel-shaped member, and eccentric means on said lever in engagement with a portion of said locking shim whereby one portion of said eccentric bears against said shim to lock the shim and arm extension relative to the channel member and another portion of said eccentric bears against said shim to permit the arm extension to be moved relative to the channel member, and said shim has a hollowed-out lower portion in alignment with the eccentric on the lever to provide a bearing surface for said eccentric when said eccentric is moved into locking position by said lever means.

2. A windshield wiper arm as claimed in claim 1 wherein said shim has a reinforcing rib extending transverse to the channelled-out portion for distributing the locking force across the surface of the arm extension.

3. In a windshield wiper arm having a channel-shaped section pivotally carried by an attaching section, and an elongate arm extension member extending into the outer end of said channel-shaped member, in the combination, an elongate non-metallic latching shim nested in said channel-shaped member and having an upper portion shaped to partially surround the one end portion of the arm extension, lever means pivotally connected between the side walls of the channel-shaped member, said shim having a hollowed-out lower portion forming a bearing surface in alignment with said lever means, and eccentric means on said lever in engagement with the bearing surface on said hollowed-out portion of said locking shim whereby said eccentric on said lever either locks the shim and arm extension relative to the channel member or permits the arm extension to be moved relative to the channel member.

* * * * *